United States Patent
Takekuma et al.

(10) Patent No.: US 6,592,931 B2
(45) Date of Patent: *Jul. 15, 2003

(54) COATING METHOD

(75) Inventors: Hideaki Takekuma, Kanagawa (JP); Mikio Tomaru, Kanagawa (JP)

(73) Assignee: Fuji Photo Film Co., Ltd., Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/427,065

(22) Filed: Oct. 26, 1999

(65) Prior Publication Data

US 2002/0160099 A1 Oct. 31, 2002

(30) Foreign Application Priority Data

Oct. 27, 1998 (JP) .............................. 10-305771
Oct. 27, 1998 (JP) .............................. 10-305772

(51) Int. Cl.$^7$ .............................. B05D 1/26; B05D 3/12; B05D 11/02
(52) U.S. Cl. .............................. 427/9; 427/8; 427/355; 427/359; 427/361; 427/421; 118/110; 118/112; 118/118; 118/123; 118/325
(58) Field of Search .............................. 118/110, 112, 118/118, 119, 123, 324, 325; 427/421, 355, 359, 361, 8, 9

(56) References Cited

U.S. PATENT DOCUMENTS

| 4,332,840 A | | 6/1982 | Tanaka et al. .............. 427/130 |
|---|---|---|---|
| 4,651,672 A | * | 3/1987 | Sommer ..................... 118/126 |
| 4,944,808 A | | 7/1990 | Sugiyama et al. ............ 134/15 |
| 5,153,033 A | * | 10/1992 | Shibata et al. ............. 427/356 |
| 5,306,523 A | | 4/1994 | Shibata ....................... 427/129 |
| 5,582,870 A | * | 12/1996 | Shigesada et al. .......... 427/358 |
| 5,869,143 A | * | 2/1999 | Becker et al. .............. 427/358 |
| 5,919,524 A | * | 7/1999 | Paloviita et al. ............ 427/348 |
| 6,010,739 A | * | 1/2000 | Ueberschar et al. .......... 427/8 |
| 6,033,723 A | * | 3/2000 | Kistler et al. ............... 427/131 |

FOREIGN PATENT DOCUMENTS

| GB | 2-296203 | 6/1996 | ............ B05D/1/26 |
|---|---|---|---|
| JP | 06-106122 | 4/1994 | ............ B05C/5/02 |

* cited by examiner

Primary Examiner—Shrive P. Beck
Assistant Examiner—Kirsten Crockford Jolley
(74) Attorney, Agent, or Firm—Sughrue Mion, PLLC (57) ABSTRACT

In a coating method, a precoating layer is applied to one surface of a web W laid between a plurality of web guide rollers GR while a leading end surface of an extrusion-type head portion EX is pressed against the one surface of the web. Accordingly, entrained air increasing as the transferring speed of the web becomes higher could be prevented from entering a coating point on a doctor edge surface near an outlet of a slot by the meniscus of coating liquid formed in a slight gap between the front edge surface of the extrusion-type head portion and the one surface of the web approaching there. As a result, the precoating layer having an excessive amount can be applied stably without turbulence at the coating point caused by the entrained air. Further, coating can be done stably in the rod portion by setting the thickness of the precoating layer for a final coating layer and a virtual coating layer.

16 Claims, 3 Drawing Sheets

COATING METHOD

BACKGROUND OF THE INVENTION

1. Field of the Invention

The present invention relates to a coating method for various media for recording images or data, such as magnetic tape, photographic film, photographic paper, etc., and particularly relates to a coating method based on a rod-coat system.

2. Description of the Related Art

Conventionally, known rod-coat systems or known bar-coat systems are roughly classified into three, that is, one that which uses a rod having a smooth and cylindrical outer-circumferential surface, one that which uses a rod wound with a wire, and one that which uses a rod provided with a narrow groove, as schematically explained, for example, Yuji Harazaki, "Coating Systems", Chapter "Rod Coater", Maki Shoten Co., Oct. 30, 1979, pp 51–56.

The coating method is to measure and smooth coating liquid excessively applied in advance to one surface of a flexible long-sized band-shaped support (hereinafter referred to as 'web') transferred continuously, and to provide a coating layer.

Such a rod wound with a wire or a rod provided with a narrow groove is suitable for a method in which a coating liquid excessively applied in advance to one surface of a flexible long-sized band-shaped support (hereinafter abbreviated to "web") transferred continuously is measured in accordance with the diameter of the wire or the depth of the groove and then smoothed so that a comparatively large amount of coating film is provided. However, wale streaks often appear in the coated surface easily, and there is a problem in durability and manufacturing cost of the rod itself.

Figure 4:
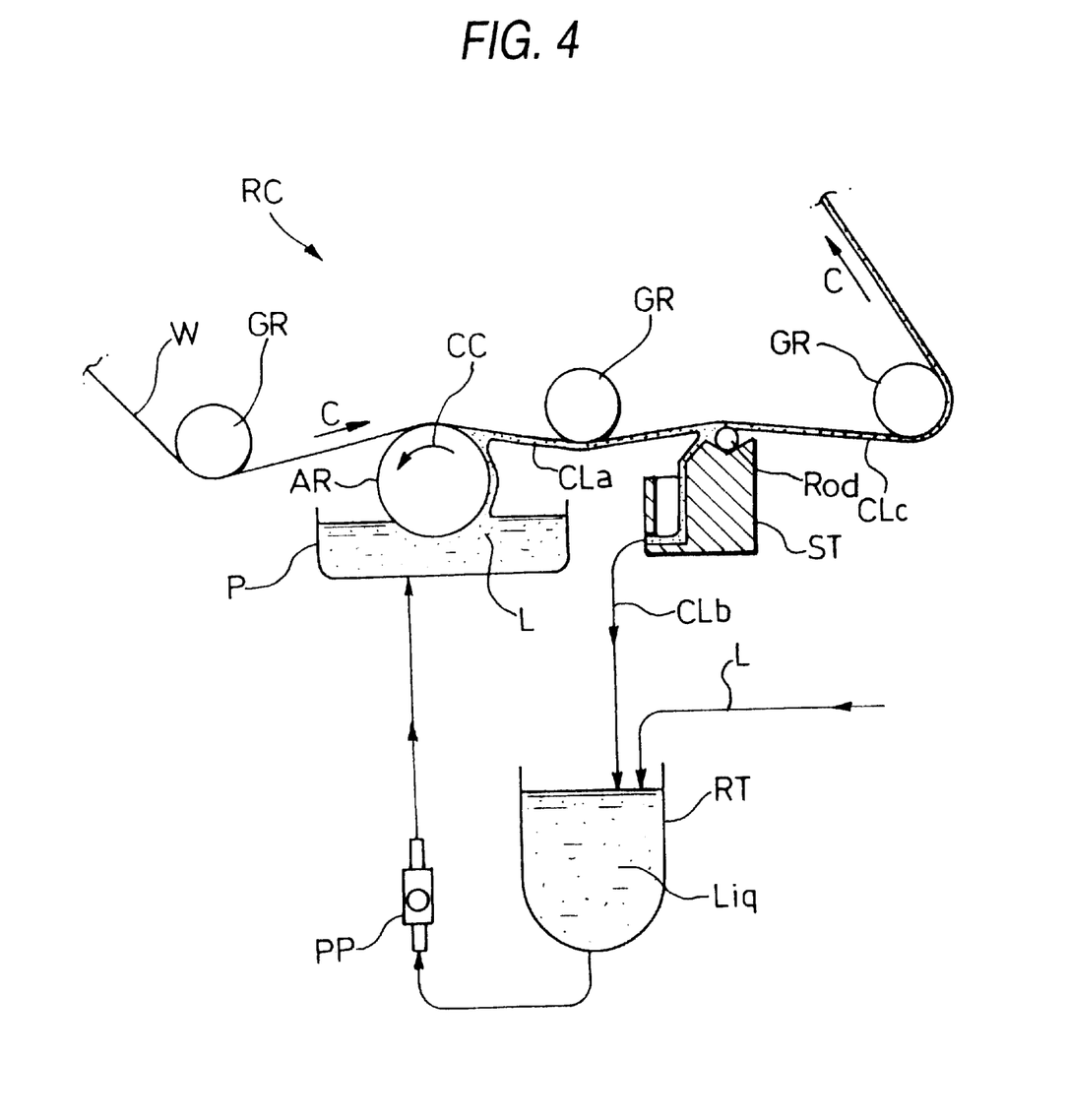
FIG. 4 is a schematic side view of the whole of a coating apparatus for carrying out a background-art coating method.

The rod having a smooth and cylindrical outer-circumferential surface, which can be manufactured at a low cost and has a long life, is suitable for a method in which a comparatively small amount of coating film is provided. A coating apparatus using such a rod usually had such a configuration as shown in FIG. 4.

That is, according to a conventional coating apparatus RC, a web W is transferred continuously in the direction of the arrow C along a web track formed by a plurality of web guide rollers GR, while a precoating layer CLa with an excessive amount is applied to one surface of the web W laid between the web guide rollers GR by a precoating apparatus constituted by an applicator roll AR partially immersed in coating liquid Liq in a coating pan P and driven to rotate in a direction CC reverse to the transferring direction of the web W. After that, a rod portion Rod held in a recess portion at the upper end of a fixed stand ST and having a smooth and cylindrical outer-circumferential surface or a rod portion Rod wound with a wire is pressed against the precoating layer CLa to thereby scrape surplus coating liquid CLb off, so that a final coating layer CLc measured to a desired amount of coating is provided.

In many cases, the surplus coating liquid CLb scraped off by the rod portion Rod was not drained directly, but it was recovered in a liquid receiving tank RT, mixed with the coating liquid Liq supplied from a coating liquid supply source (not-shown), delivered to the coating pan P through a plunger pump PP, and then reused in order to reduce the cost.

A coating amount h of the final coating layer CLc in the case where the rod portion Rod had a smooth and cylindrical outer-circumferential surface was obtained on the basis of Foil's expression, that is, h R$(V·\eta/T)^{2/3}$. In this expression, h designates the coating amount ($\mu$m) of the final coating layer CLc; R, the diameter (mm) of the rod portion; V, the web transferring speed (m/min); $\eta$, the viscosity (cp) of the coating liquid; and T, the web tension (kgf/m).

In addition, in the case of a rod wound with a wire or a rod provided with a narrow groove h designates the thickness of the rod in accordance with the Foil's expression under the condition that the groove portion is removed. This is defined as a virtual coating amount.

However, in the coating method based on the above-mentioned background-art rod-coat system, because of the factors such as the web tension, the diameter of the rod portion Rod, the viscosity of the coating liquid Liq, the transferring speed of the web W, the coating amount of the precoating layer CLa, the coating amount of the final coating layer CLc, and so on, scraping mist occurs in the area where the precoating layer CLa has been scraped off on the upstream side of the rod portion Rod. Consequently, coating unevenness like herringbone-twill is induced in the surface of the final coating layer CLc. Particularly, when the coating liquid Liq containing carbon particles and/or abrasive, etc. is used in a back layer for giving properties of shading or properties of transferring, the point that light is transmitted easily and transferring of the web is made rough due to the above-mentioned coating unevenness has not been solved completely.

In addition, when the precoating apparatus is constituted by an applicator roll, the maximum speed is limited to 180 m/min, so that it is impossible to perform coating at a higher speed. Accordingly, there has been a limit to improvement of productivity. Further, in the applicator roll, the amount of precoating is determined by the diameter of the roll so as not to be controlled desirably. Accordingly, in order to manufacture many sorts of products without producing coating unevenness like herringbone-twill, it has been necessary to exchange the applicator roll in accordance with the sort. Further, when the rod portion is made of a flat bar, ribs appear in the coating and the distribution of thickness in the width direction also deteriorates.

Further, in the above-mentioned coating apparatus based on the above-mentioned background-art rod-coat system, abrasion wear of the rod portion per unit time increased sharply as the web transferring speed was made higher in order to improve the productivity and further as the hardness of abrasive added to a magnetic recording layer increased. As a result, unevenness of the thickness of the final coating layer or a rib fault in the surface of the final coating layer often appeared, while the life of the rod portion was reduced. Accordingly, not only the time when a coating line suspended increased for exchanging the rod portion, but also the manufacturing cost was apt to increase.

Particularly, the abrasion resistance of a rod wound with a wire or a rod provided with a narrow groove was low. This was because only a wire of comparatively soft material such as SUS can be wound on a rod.

In addition, when the rod portion was made to be a flat bar, ribs appeared in the coating layer.

SUMMARY OF THE INVENTION

It is an object of the present invention to provide a coating method based on a rod-coat system which is superior in the quality of a coating surface, capable of high speed coating, and convenient to exchange the sort of products.

It is another object of the present invention to provide a coating apparatus based on a rod-coat system which can improve the abrasion resistance of a rod and which can ensure superior surface quality without producing any ribs. According to a first aspect of the present invention, in a coating method, one surface of a flexible long-sized band-shaped support laid between a plurality of web guide rollers forming a portion of a web track is coated with a precoating layer with an excessive amount by a precoating apparatus while the flexible band-shaped support is transferred continuously along the web track, and thereafter a rod portion is pressed against the precoating layer to thereby scrape surplus coating liquid off so as to lay a final coating layer measured to a desired amount, wherein a leading end surface of an extrusion-type head portion is pressed against the one surface of the flexible band-shaped support laid between the web guide rollers so that the precoating layer is applied thereto.

According to a second aspect of the present invention, in the coating method of the first aspect, a relation between a coating amount of the precoating layer and a coating amount of the final coating layer satisfies an expression [1]:

$$6\eta^{-0.3} \leq H/h \qquad [1]$$

where H designates the coating amount of the precoating layer (cc/m$^2$); h, the coating amount and virtual coating amount of the final coating layer; and $\eta$, viscosity (cp) of the coating liquid.

According to a third aspect of the present invention, in the coating method of the first or second aspect, a flat bar having a rod diameter not larger than 6 mm is used as the rod portion to scrape the surplus coating liquid off.

According to a fourth aspect of the present invention, in the coating method of any one of the first to third aspects, the coating amount of the final coating layer is made to be not larger than 15 cc/M$^2$.

According to a fifth aspect of the present invention, in a coating apparatus, one surface of a long-sized web laid between a plurality of web guide rollers forming a portion of a web track is coated with a precoating layer with an excessive amount by a precoating apparatus while the web is transferred continuously along the web track, and thereafter a rod portion is pressed against the precoating layer to thereby scrape surplus coating liquid off so as to lay a final coating layer measured to a desired amount; in that the rod portion has an outer-circumferential surface with Vickers hardness (Hv) of 1,000 or more.

According to a sixth aspect of the present invention, in a coating apparatus of the fifth aspect, the rod portion is a flat rod.

According to a seventh aspect of the present invention, in a coating apparatus of the fifth or sixth aspect, the rod portion comprising a super hard alloy.

According to an eighth aspect of the present invention, in a coating apparatus of any one of the fifth to seventh aspects, the rod diameter of the rod portion is not larger than 20 mm.

According to the above-mentioned coating method of the first aspect, entrained air increasing as the transferring speed of the web becomes higher is prevented from entering a coating point near the leading end surface of the extrusion-type head portion by the meniscus of the coating liquid formed in a slight gap between the leading end surface of the extrusion-type head portion and the concave one surface of the web. As a result, the precoating layer having an excessive amount is applied stably without turbulence, at the coating point, due to the entrained air.

The rod portion in the present invention may be any one of a flat rod having a smooth and cylindrical outer-circumferential surface, a wire rod wound with a wire, and a rod provided with a groove in its cylindrical outer-circumferential surface.

Further, according to the above-mentioned coating method of the second aspect, the relation between the coating amount of the precoating layer and the coating amount of the final coating layer satisfies the expression [1]. Accordingly, scraping mist is restrained from being produced in the area where the precoating layer is scraped off on the upstream side of the rod portion. As a result, coating unevenness like herringbone-twill is prevented from being produced on the surface of the final coating layer.

$$6\eta^{-0.3} \leq H/h \qquad [1]$$

In the expression [1], H designates the coating amount of the precoating layer (cc/m$^2$); h, the coating amount and the virtual coating amount of the final coating layer (cc/m$^2$); and $\eta$, the viscosity (cp) of the coating liquid.

The inventors of the present invention carried out various coating experiments while changing the viscosity of the coating liquid, the coating amount of the precoating layer, and the coating amount and the virtual coating amount of the final coating layer. As a result, the inventor found out that coating superior in surface quality could be performed if the above-mentioned values satisfied the relation of the expression [1].

In addition, since the precoating apparatus is formed as an extrusion-type head at this occasion, it is possible to ensure a wide region where the precoating layer can be applied, so that various sorts of products can be manufactured without making a change in equipments and without producing coating unevenness like herringbone-twill.

Further, according to the above-mentioned coating method of the third aspect, a flat bar the rod diameter of which is not larger than 6 mm is used as the rod portion so as to scrape the surplus coating liquid off. It is therefore possible to avoid ribs.

Further, according to the above-mentioned coating method of the fourth aspect, the coating amount of the final coating layer is made not larger than 15 cc/m$^2$. It is therefore possible to form a coating layer which is uniform in the width direction.

According to the above-mentioned coating apparatus of the fifth aspect, the rod portion has an outer-circumferential surface with Vickers hardness (Hv) of 1,000 or more. Accordingly, the abrasion wear of the rod portion per unit time is greatly restrained from increasing, so that the life of the rod portion can be made much longer.

Further, according to the above-mentioned coating apparatus of the sixth aspect, the rod portion is a flat rod, so that the abrasion resistance of the rod portion is more improved.

Further, according to the above-mentioned coating apparatus of the seventh aspect, the rod portion is formed of a super hard alloy, so that the abrasion resistance of the rod portion is more improved.

Further, according to the above-mentioned coating apparatus of the eighth aspect, the diameter of the rod portion is not larger than 20 mm, so that it is possible to restrain ribs from appearing.

BRIEF DESCRIPTION OF THE DRAWINGS

In the accompanying drawings:

FIGS. 3A and 3B are perspective views showing a part of the rod portion in FIG. 1; in which FIG. 3A shows a flat rod, while FIG. 3B shows a wire rod.

DETAILED DESCRIPTION OF THE INVENTION

Figure 1:
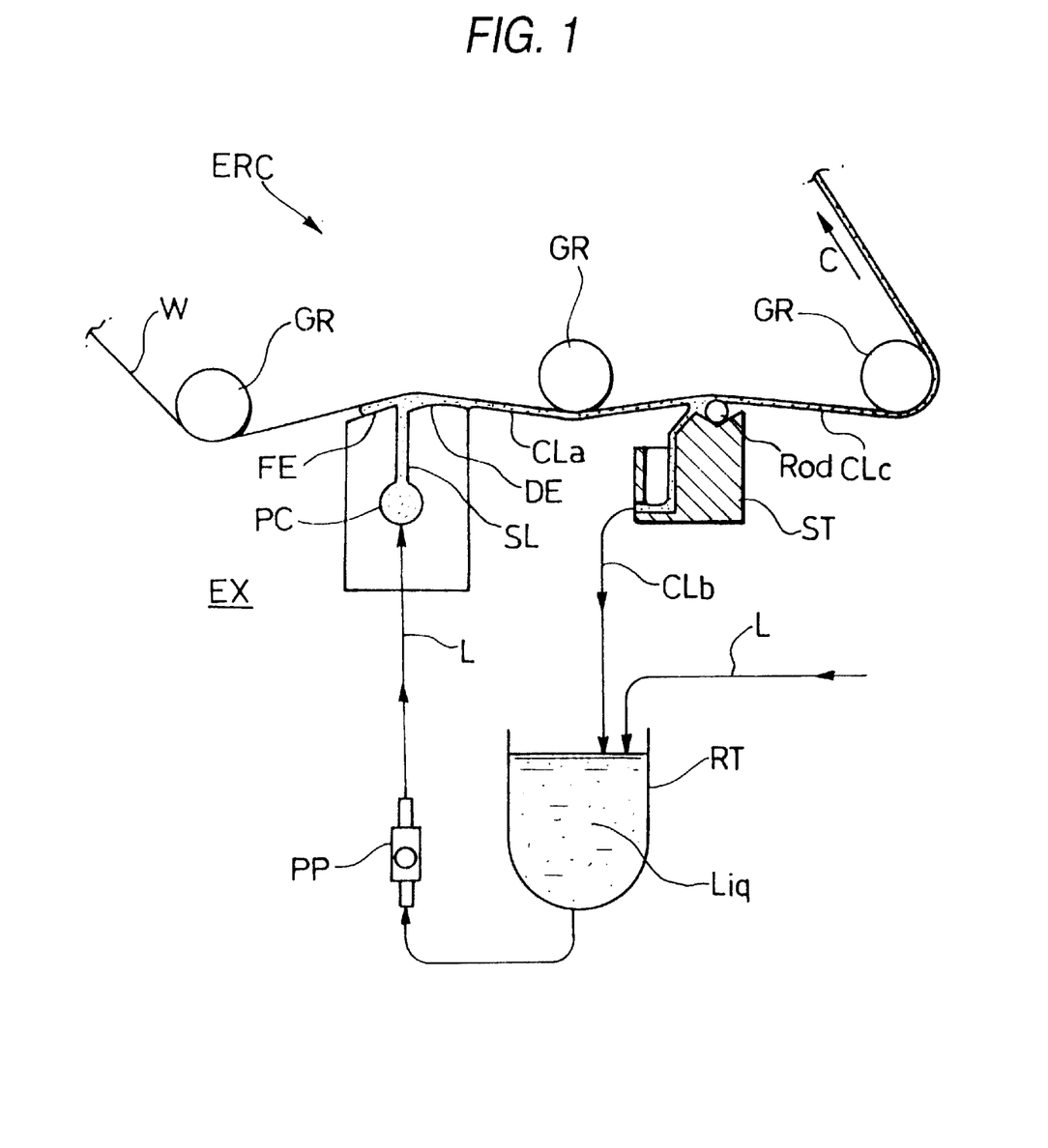
FIG. 1 is a schematic side view of the whole of a coating apparatus for carrying out a coating method according to the present invention.
Figure 2:
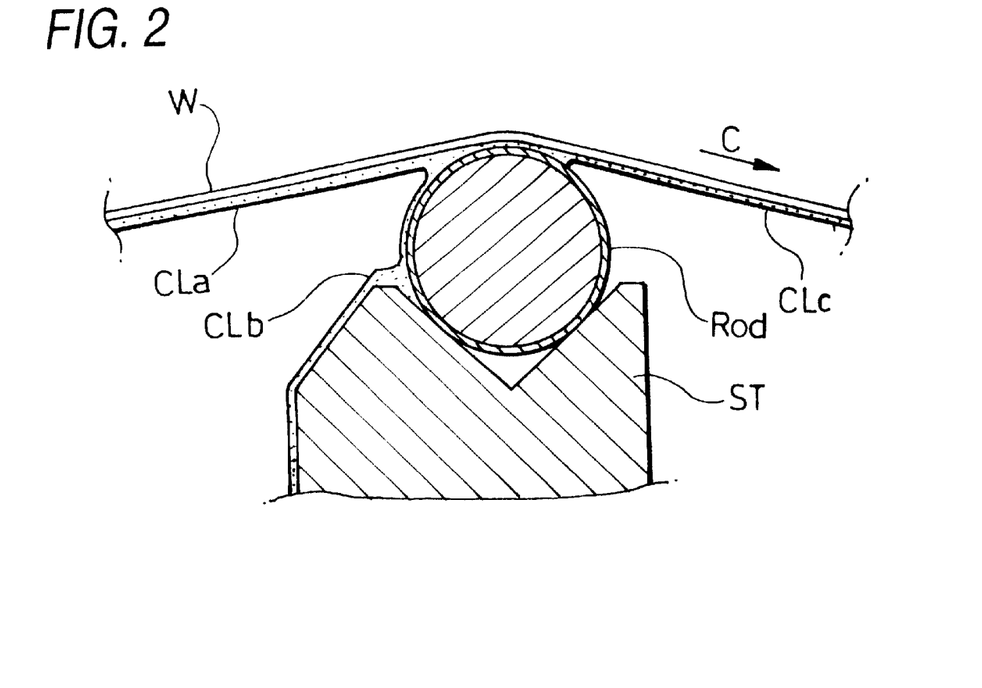
FIG. 2 is a schematic enlarged side view showing a part of a rod portion of FIG. 1.
Figures 3A, 3B:
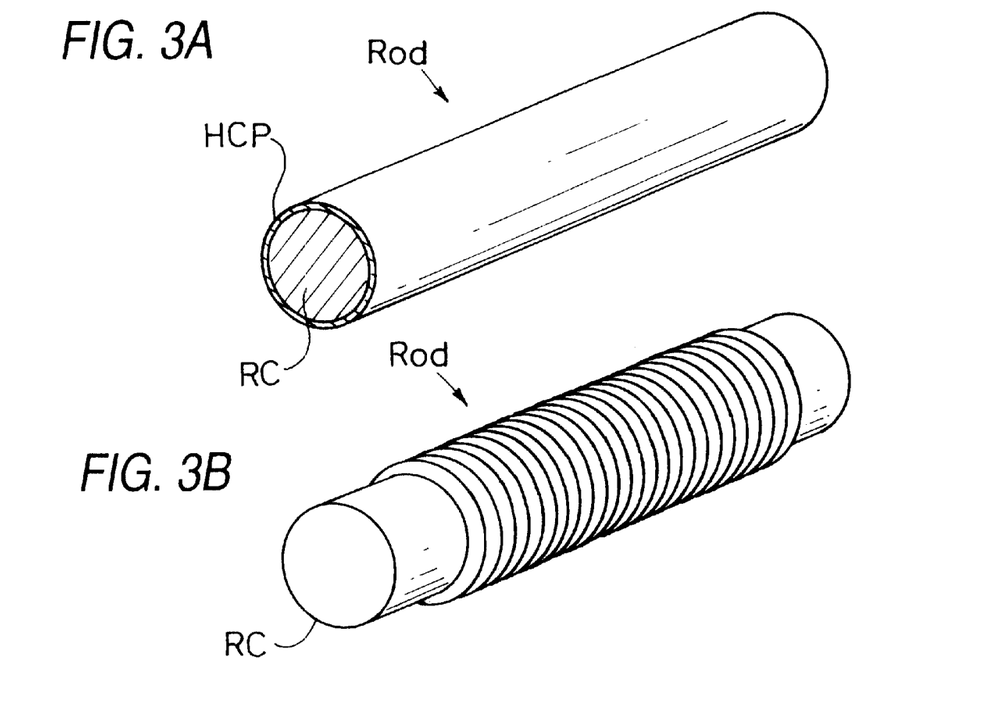

An embodiment of a coating method and a coating apparatus according to the present invention will be described blow in detail with reference to the accompanying drawings. FIG. 1 is a schematic side view of the whole of a coating apparatus for carrying out the coating method according to the present invention. FIG. 2 is a schematic enlarged side view showing a part of a rod portion in FIG. 1. FIGS. 3A and 3B are perspective views showing a part of the rod portion in FIG. 1. FIG. 3A shows a flat rod, while FIG. 3B shows a wire rod. Incidentally, the present invention is not limited to this embodiment.

Generally, examples of the web W in the present invention include flexible band-shaped substances each having a width in a range of from 0.3 to 1 m, a length in a range of from 45 to 10,000 m and a thickness in a range of from 2 to 200 $\mu$m, and consisting of plastic film such as polyethylene terephthalate, polyethylene-2,6-naphthalate, cellulose diacetate, cellulose triacetate, cellulose acetate propionate, polyvinyl chloride, polyvinylidene chloride, polycarbonate, polyimide, polyamide, etc.; paper; paper coated or laminated with $\alpha$-polyolefin the carbon number of which is in a range of from 2 to 10, such as polyethylene, polypropylene, ethylene-butene copolymer, etc.; metal foil such as aluminum, copper, tin, etc.; and so on; or band-shaped substances in which the above-mentioned band-shaped substance is used as base material and provided with a processed layer formed on the surface.

In a coating apparatus ERC for carrying out a coating method according to the present invention, a web W is continuously transferred along a web track formed by a plurality of web guide rollers GR in the direction of the arrow C. One surface of the web W laid among the plurality of web guide rollers GR is coated with a precoating layer CLa having an excessive amount by means of a precoating apparatus constituted by an extrusion-type head portion EX. Thereafter, a rod portion Rod is pressed against the precoating layer CLa to thereby scraper surplus coating liquid CLb off. The rod portion Rod is held in a recess portion at the upper end of a fixed stand ST and has a smooth and cylindrical outer-circumferential surface. Consequently, a final coating layer CLc measured to a desired amount of coating is formed.

For example, the surplus coating liquid CLb is scraped off by the rod portion Rod in which hard chrome plating HCP is applied to the cylindrical outer-circumferential surface of a rod core RC consisting of SUS material having a diameter in a range of from 1 to 20 mm, preferably, 1 to 6 mm, so that the rod portion Rod has Vickers hardness (Hv) larger than 1,000 and surface roughness (Rma) smaller than 1 $\mu$m. The scraped surplus coating is not drained directly, but it is recovered in a liquid receiving tank RT, mixed with the coating liquid Liq supplied from a coating liquid supply source (not-shown), delivered under pressure to the extrusion-type head portion EX through a plunger pump PP, and then reused therein. A super hard alloy may be used for the rod portion Rod.

The coating composition Liq is supplied under pressure into a pocket PC. The extrusion-type head portion EX for applying the precoating layer CLa excessively to one surface of the web W laid between the web guide rollers GR continuously supplies the coating liquid Liq from the pocket PC to a slight gap between the leading end surface of the head portion EX and the one surface of the web W through a slot SL communicating with the pocket PC while making the pressure of the coating liquid Liq uniform in the width direction of the web W.

The leading end surface of the extrusion-type head portion EX is formed so that a front edge surface FE constituted by a slope with an angle substantially approximating the angle of approach of the web W is disposed on the upstream side of an outlet of the slot SL arranged at the center of the leading end surface, while a doctor edge surface DE constituted by a convex curved surface corresponding to the one surface of the web W bent like a concave in the direction reverse to the head portion EX is disposed on the downstream side of the outlet of the slat SL.

The web W is transferred on the curved doctor edge surface DE so that the gap between the one surface of the web W on the downstream side and the doctor edge surface DE gradually decreases over a range from the vicinity of the outlet of the slot SL to a downstream corner portion of the doctor edge surface DE. Then, the web W leaves for the rod portion Rod on the downstream side.

When the set conditions of the extrusion-type head portion EX such as the web tension, the angle of approach of the web, the leaving angle of the web, the inclination angle of the front edge surface FE, the radius of curvature of the doctor edge surface DE, the difference of elevation between the front edge surface FE and the doctor edge surface DE forming the outlet of the slot SL, and so on, are selected suitably, the entrained air increasing as the transferring speed of the web W increases is prevented from entering a coating point on the doctor edge surface DE near the outlet of the slot SL by the meniscus of the coating liquid Liq formed in the slight gap between the front edge surface FE and the one surface of the web W approaching the extrusion-type head portion EX. As a result, the precoating layer CLa having an excessive amount is applied stably without turbulence at the coating point caused by the entrained air.

Particularly, even if the coating liquid Liq is, for example, a non-Newtonian fluid used for a back layer for giving properties of transferring and properties of shading to the web W, the leading end surface of the extrusion-type head portion EX applies the coating liquid Liq to the one surface of the web w transferred at a comparatively high speed through the above-mentioned slight gap so that the thickness of the layer formed by the coating liquid Liq is made uniform in the width direction of the web W. In such a manner, the precoating layer CLa having an excessive amount is provided.

According to the coating method of the present invention, the coating liquid Liq is not limited to non-Newtonian fluid such as coating liquid for a magnetic tape. Even if the coating liquid Liq is a Newtonian fluid using a comparatively low-viscosity gelatin solution as a binder for a photographic sensitive layer, the precoating layer CLa having a desired excessive amount can be provided stably.

Next, the smooth and cylindrical outer-circumferential surface of the rod portion Rod disposed on the downstream side of the extrusion-type head portion EX is pressed against the precoating layer CLa which is in a wet state. The rod portion Rod scrapes the above-mentioned excessive amount of the precoating layer CLa on the upstream side when the precoating layer CLa passes through the rod portion Rod, so that the final coating layer CLc measured to a desired amount of coating is transferred to the downstream side.

In order to restrain the production of scraping mist which is caused when the rod portion Rod scrapes the precoating layer CLa off and which is harmful on the quality of the coating surface, the coating amount H (cm/m$^2$) of the precoating layer CLa and the coating amount h (cc/m$^2$) of the final coating layer CLc by means of the extrusion-type head portion EX are set to satisfy the expression [1].

$$6\eta^{-0.3} \leq H/h \quad [1]$$

In other words, the coating amount H of the precoating layer CLa is set to be 6 times or more as large as the product of the coating amount h and the virtual coating amount h of the final coating layer CLc and the viscosity $\eta^{-0.3}$ (cp) of the coating liquid Liq. As a result, scraping mist of the precoating layer CLa is restrained from being produced, so that coating unevenness like herringbone-twill is prevented from appearing on the coating surface of the final coating layer CLc.

The coating method based on a rod-coat system according to the present invention which has been described above has new effects as follows. That is, in the coating method according to the present invention, after one surface of the web laid between a plurality of web guide rollers is coated with the precoating layer with an excessive amount by means of the precoating apparatus while the web is transferred continuously along the web track partially formed by the web guide rollers, the rod portion having the aforementioned smooth cylindrical outer circumferential surface is pressed against the precoating layer to thereby scrape the surplus coating liquid off so that the final coating layer measured to a desired amount of coating is provided. The leading end surface of the extrusion-type head portion is pressed against the one surface of the web laid between the web guide rollers for coating. Accordingly, entrained air increasing as the transferring speed of the web increases can be prevented from entering a coating point on the doctor edge surface near the outlet of the slot by the meniscus of the coating liquid formed in the slight gap between the front edge surface of the extrusion-type head portion and the one surface of the web approaching there. As a result, the precoating layer having an excessive amount can be applied stably without turbulence at the coating point caused by the entrained air. Further, since it is not necessary to exchange parts in accordance with different sorts of products, it is possible to manufacture many sorts of products efficiently.

Further, in the coating method according to the present invention, the relation between the coating amount of the precoating layer and the coating amount of the final coating layer satisfies the expression [1], so that scraping mist can be restrained from being produced in the area where the precoating layer is scraped off on the upstream side of the rod portion. As a result, coating unevenness like herringbone-twill can be prevented from being produced on the surface of the final coating layer.

$$6\eta^{-0.3} \leq H/h \quad [1]$$

In the expression [1], H designates the coating amount of the precoating layer (cc/m$^2$); h, the coating amount and the virtual coating amount of the final coating layer (cc/m$^2$); and $\eta$, the viscosity (cp) of the coating liquid.

Further, in the coating method according to the present invention, a flat bar the rod diameter of which is not larger than 6 mm is used as the rod portion so as to scrape the surplus coating liquid off. It is therefore possible to avoid ribs.

Further, in the coating method according to the present invention, the coating amount of the final coating layer is made not larger than 15 cc/M$^2$. It is therefore possible to form a coating layer which is uniform in the width direction.

The coating apparatus based on a rod-coat system according to the present invention which has been described above has new effects as follows. That is, according to the coating apparatus of the present invention, one surface of the web laid between a plurality of web guide rollers is coated with the precoating layer having an excessive amount by means of the precoating apparatus while the web is transferred continuously along the web track partially formed by the web guide rollers, the rod portion is pressed against the precoating layer to thereby scrape the surplus coating liquid off, so that the final coating layer having a desired amount is provided. The rod portion has an outer-circumferential surface with Vickers hardness (Hv) of 1,000 or more. Accordingly, the abrasion wear of the rod portion per unit time is greatly restrained from increasing, so that the life of the rod portion can be made prolonged largely. In addition, if a flat bar is used as a rod portion, the abrasion resistance of the rod portion is further improved. Further, if the size of the rod portion which is the flat bar is not larger than 20 mm, it is possible to obtain superior surface quality without producing any ribs.

Further, according to the coating apparatus of the present invention, the rod portion is a flat rod, so that the abrasion resistance of the rod portion can be made more improved. Further, according to the coating apparatus of the present invention, the rod portion is formed of a super hard alloy, so that the abrasion resistance of the rod portion can be made more improved. The above-mentioned new effects of the coating apparatus of the present invention will be made clearer by examples.

EXAMPLES

Example 1

Components shown below were thrown into a non-magnetic coating liquid ball mill, mixed and dispersed. After that, 300 parts by weight of epoxy resin (epoxy equivalent: 500) was added thereto and prepared.

1) Composition of non-magnetic coating liquid

| | |
|---|---|
| coarse-particle carbon (average particle size: 300 nm) | 535 parts by weight |
| fine-particle carbon (average particle size: 20 nm) | 8 parts by weight |
| abrasives: alumina | 1 part by weight |
| nitrocellulose | 15 parts by weight |
| polyurethane resin | 8 parts by weight |
| polyisocyanate | 110 parts by weight |
| methyl ethyl ketone | 5000 parts by weight |
| toluene | 1000 parts by weight |
| viscosity: shear rate 76.6 sec$^{-1}$ × 20° C. × 5.6 cp | |
| viscosimeter: E-type viscosimeter (VISCONIC ED type) made by Tokimec Inc. | |

To change the viscosity, the components were changed as follows.

| | |
|---|---|
| 1) methyl ethyl ketone | 4000 parts by weight |
| toluene | 800 parts by weight |
| viscosity: shear rate 76.6 sec$^{-1}$ × 20° C. × 10.3 cp | |
| 2) methyl ethyl ketone | 700 parts by weight |
| toluene | 140 parts by weight |
| viscosity: shear rate 76.6 sec$^{-1}$ × 20° C. × 80 cp | |

The non-magnetic coating liquid thus prepared was applied to one surface of a web consisting of polyethylene terephthalate film 6 μm thick under the conditions shown in Table 1 by means of the respective coating apparatuses shown in FIGS. 1 and 4. The surface qualities of final coating layers (unevenness in coating like herringbone-twill and unevenness in coating thickness in the width direction) were observed and evaluated. The results of evaluation of the surface quality are shown also in Table 1.

TABLE 1

| sample No. | Ap or EX | Rod Type | t (μm) | V (m/min) | η (cp) | H (cc/m²) | h (cc/m²) | H · η$^{0.3}$/h | Coating Unevenness |
|---|---|---|---|---|---|---|---|---|---|
| 1-1 | EX | flat | 6 | 160 | 10.3 | 32.5 | 5.9 | 11.1 | A |
| 1-2 | EX | flat | 6 | 300 | 10.3 | 17.7 | 5.9 | 6.0 | A |
| 1-3 | EX | flat | 6 | 300 | 10.3 | 24.5 | 5.9 | 8.4 | A |
| 1-4 | EX | flat | 6 | 300 | 10.3 | 70.8 | 5.9 | 24.2 | A |
| 1-5 | EX | flat | 6 | 300 | 10.3 | 75 | 12.5 | 12.1 | A |
| 1-6 | EX | flat | 6 | 300 | 5.6 | 31.5 | 5.9 | 9.0 | A |
| 1-7 | EX | flat | 6 | 300 | 80 | 25.6 | 9.6 | 9.9 | A |
| 1-8 | EX | flat | 75 | 300 | 10.3 | 20.4 | 5.1 | 8.1 | A |
| 1-9 | EX | flat | 6 | 300 | 10.3 | 15.3 | 5.9 | 5.2 | B |
| 1-10 | EX | wire | 6 | 300 | 10.3 | 32.5 | 5.9 | 11.1 | A |
| 1-11 | EX | wire | 6 | 300 | 10.3 | 72.6 | 5.9 | 24.8 | A |
| 1-12 | EX | flat | 6 | 400 | 10.3 | 24.2 | 5.9 | 8.3 | A |
| 1-13 | EX | flat | 6 | 300 | 10.3 | 14.8 | 5.9 | 5.0 | B |
| 1-14 | EX | flat | 6 | 300 | 10.3 | 72.6 | 5.9 | 24.8 | A |

AP or EX: Precoating type
EX: extrusion-type head portion
AP: applicator roll
t: Support thickness
V: Web transferring speed
η: Coating liquid viscosity
H: Precoating amount
h: final coating amount and virtual coating amount
Surface quality evaluation:
A: Superior
B: a little inferior As is apparent from Table 1, superior coating could be made without coating unevenness and thickness unevenness when:

$$6\eta^{-0.3} \leq H/h \quad [1]$$

Example 2

An excessive amount of precoating layer of non-magnetic coating liquid similar to that in Example 1 was applied to one surface of a web consisting of polyethylene terephthalate film 6 μm thick under the conditions shown in Table 2 by means of the coating apparatus shown in FIGS. 1 and 4, and changes of the coating amount of the precoating layer in accordance with the precoating apparatus and the web transferring speed were measured. The results of measurement of the coating amount of the precoating layer were shown also in Table 2.

TABLE 2

| | Coating Condition | | | | |
|---|---|---|---|---|---|
| Sample No. | Precoating Type AP or EX | Web tension T (kgf/m) | Web transferring speed V (m/min) | Coating liquid viscosity η (cp) | Precoatable amount (cc/m²) |
| 2-1 | EX | 7 | 160 | 10.3 | 8–90 |
| 2-2 | EX | 7 | 300 | 10.3 | 10–80 |
| 2-3 | EX | 20 | 300 | 10.3 | 7–75 |
| 2-4 | EX | 7 | 400 | 10.3 | 15–62 |
| 2-5 | EX | 7 | 500 | 10.3 | 20–40 |
| 2-6 | EX | 7 | 600 | 10.3 | 25–35 |
| 2-7 | AP | 7 | 160 | 10.3 | 25.4 |
| 2-8 | AP | 7 | 300 | 10.3 | impossible |
| 2-9 | EX | 7 | 300 | 26 | 16–95 |

EX: extrusion-type head portion
AP: applicator roll

As is apparent from Table 2, by using an extrusion-type head portion as a precoating apparatus, it was possible to cope with wide coating range even if the coating speed, the tension and the liquid sort were changed. Then, when the liquid sort was to be changed, it went well if only a measuring bar was exchanged. In addition, when the coating speed was set to 600 m/min, superior coating could be done.

Example 3

Non-magnetic coating liquid similar to that in Example 1 was applied to one surface of a web of polyethylene terephthalate film 6 μm thick under the conditions shown in Table 3 by the respective coating apparatuses shown in FIGS. 1 and 4, and appearance of ribs was measured with respect to the rod diameter. The results of evaluation of surface quality based on the appearance of ribs were shown also in Table 3.

TABLE 3

| | Coating conditions | | | | | |
|---|---|---|---|---|---|---|
| Sample No. | Precoating Type | Web tension T (kgf/m) | Web transferring speed V (m/min) | coating liquid viscosity η (cp) | rod diameter (mm) | rib evaluation |
| 3-1 | EX | 7 | 300 | 10.3 | 3 | A |
| 3-2 | EX | 7 | 300 | 10.3 | 6 | A |
| 3-3 | EX | 7 | 300 | 10.3 | 7 | B |
| 3-4 | EX | 15 | 300 | 10.3 | 3 | A |
| 3-5 | EX | 7 | 600 | 10.3 | 3 | A |
| 3-6 | EX | 7 | 600 | 10.3 | 7 | B |
| 3-7 | EX | 7 | 300 | 26 | 3 | A |
| 3-8 | EX | 7 | 300 | 26 | 7 | B |

EX: extrusion-type head portion
Rib evaluation:
A: superior
B: a little inferior As is apparent from Table 3, even if the web tension, the web transferring speed and the coating liquid viscosity were changed as shown in Table 3, coating with superior surface quality could be done without producing any rib when the rod diameter was not larger than 6 mm.

Example 4

Non-magnetic coating liquid similar to that in Example 1 was applied to one surface of a web consisting of polyethylene terephthalate film 6 μm thick under the conditions shown in Table 4 by the coating apparatus shown in FIG. 1. Changes in thickness of the final coating layers in the width direction in accordance with a coating amount was measured. Evaluations of changes in the thickness were shown also in Table 4.

TABLE 4

| | | Coating conditions | | | | | |
|---|---|---|---|---|---|---|---|
| Sample No. | Pre-coating type | Web tension T (kgf/m) | Web transferring speed V (m/min) | Coating liquid viscosity η (cp) | Rod diameter (mm) | Final coating layer (cc/m²) | Widthwise thickness change evaluation |
| 4-1 | EX | 9 | 300 | 10.3 | 3.0 | 7.1 | A |
| 4-2 | EX | 9 | 300 | 10.3 | 6.0 | 14.8 | A |
| 4-3 | EX | 9 | 300 | 10.3 | 6.3 | 15.8 | B |
| 4-4 | EX | 5 | 300 | 10.3 | 3.0 | 14.3 | A |
| 4-5 | EX | 4 | 300 | 10.3 | 3.0 | 16.2 | B |
| 4-6 | EX | 9 | 600 | 10.3 | 3.0 | 13.5 | A |
| 4-7 | EX | 9 | 300 | 26 | 3.0 | 12.4 | A |

EX: extrusion-type head portion
Rib evaluation:
A: superior
B: a little inferior

Example 5

Components shown below were thrown into a non-magnetic coating liquid ball mill, mixed and dispersed. After that, 300 parts by weight of epoxy resin (epoxy equivalent: 500) was added thereto and prepared.

1) Composition of non-magnetic coating liquid

| | |
|---|---|
| coarse-particle carbon (average particle size: 300 μm) | 535 parts by weight |
| fine-particle carbon (average particle size: 20 μm) | 8 parts by weight |
| abrasives: alumina | 1 part by weight |
| nitrocellulose | 15 parts by weight |
| polyurethane resin | 8 parts by weight |
| polyisocyanate | 110 parts by weight |
| methyl ethyl ketone | 4000 parts by weight |
| toluene | 800 parts by weight |
| viscosity: shear rate 76.6 sec$^{-1}$ × 20° C. × 10.3 cp | |
| viscosimeter: E-type viscosimeter (VISCONIC ED type) made by Tokimec Inc. | |

The non-magnetic coating liquid prepared was applied to one surface of a web consisting of polyethylene terephthalate film 6 μm thick under the conditions shown in Table 5 by the coating apparatus shown in FIG. 1. The continuous transferring length of the web in the maximum with which the surface quality of a final coating layer (unevenness of coating like herringbone-twill and unevenness in coating thickness of a coating film in the width direction) could be kept in a normal level was measured. The results of the measurement were shown also in Table 5.

TABLE 5

| | Rod portion dimensions | | | | coating conditions | | | | maximum web |
|---|---|---|---|---|---|---|---|---|---|
| Sample No. | rod type | 6 mmφ rod core | hard chromium plating thickness (μm) | Vickers hardness (Hv) | web transferring speed V (m/min) | web tension T (kgf/m) | precoating amount Q (cc/m²) | final coating amount (cc/m²) | continuous transferring length (km) |
| 5-1 | wire | SUS | 20 | 900 | 300 | 6 | 36.6 | 6.1 | 100 |
| 5-2 | wire | SUS | 20 | 1000 | 300 | 6 | 36.6 | 6.1 | 1000 |
| 5-3 | wire | SUS | 20 | 1200 | 160 | 6 | 36.6 | 6.1 | 2200 |
| 5-4 | wire | SUS | 20 | 1200 | 300 | 6 | 36.6 | 6.1 | 2000 |
| 5-5 | wire | SUS | 20 | 1200 | 800 | 6 | 36.6 | 6.1 | 1800 |
| 5-6 | wire | SUS | 20 | 1200 | 300 | 6 | 36.6 | 10.5 | 2500 |
| 5-7 | wire | SUS | 20 | 1300 | 360 | 6 | 36.6 | 6.1 | 3000 |
| 5-8 | wire | SUS | 20 | 1300 | 800 | 6 | 36.6 | 6.1 | 2500 |
| 5-9 | flat | SHA | nothing | 1000 | 300 | 6 | 36.6 | 6.1 | semipermanent |
| 5-10 | flat | SHA | nothing | 1200 | 160 | 6 | 36.6 | 6.1 | semipermanent |
| 5-11 | flat | SHA | nothing | 1200 | 300 | 6 | 36.6 | 6.1 | semipermanent |
| 5-12 | flat | SHA | nothing | 1200 | 800 | 6 | 36.6 | 6.1 | semipermanent |
| 5-13 | flat | SHA | nothing | 1300 | 300 | 6 | 36.6 | 6.1 | semipermanent |
| 5-14 | flat | SHA | nothing | 1300 | 800 | 6 | 36.6 | 6.1 | semipermanent |
| 5-15 | wire | SUS | 20 | 300 | 300 | 6 | 36.6 | 6.1 | 30 |
| 5-16 | wire | SUS | 20 | 500 | 300 | 6 | 36.6 | 6.1 | 50 |
| 5-17 | flat | SUS | 20 | 900 | 300 | 6 | 36.6 | 6.1 | 500 |

SUS: stainless steel (SUS-304)
SHA: super hard alloy (obtained by sintering WC (tungsten carbide) powder and Co (cobalt) as binder)

As is apparent from Table 4, even if the web tension, the web transferring speed, the coating liquid viscosity and the rod diameter were changed as shown in Table 4, superior coating could be done without any widthwise change in thickness when the coating amount of the final coating layer was not larger than 15.0 cc/M².

As is apparent from Table 5, it is understood that continuous coating can be done well in the long area of the web if the Vickers hardness of the rod portion is made to be 1,000 or more. Further, continuous coating can be made well in the longer area of the web if the Vickers hardness of the rod portion is 1,200 or more.

Further, continuous coating can be done well in the long area of the web by the flat rod longer than that in the case of the wire rod if the Vickers hardness is the same in the both.

Example 6

By using a flat bar as the rod portion and changing the diameter of the flat bar, coating was carried out by means of the coating apparatus of FIG. 1. The other conditions such as coating liquid used, etc., were the same as those in Example 1. The results were shown in Table 6.

TABLE 6

| | | Coating conditions | | | | |
|---|---|---|---|---|---|---|
| Sample No. | Precoating type | Web tension T (kgf/m) | Web transferring speed V (m/min) | Viscosity (cp) | Rod diameter (mm) | Rib evaluation |
| 6-1 | EX | 7  | 300 | 10.3 | 6  | ○ |
| 6-2 | EX | 7  | 300 | 10.3 | 20 | ○ |
| 6-3 | EX | 7  | 300 | 10.3 | 21 | x |
| 6-4 | EX | 15 | 300 | 10.3 | 6  | ○ |
| 6-5 | EX | 7  | 600 | 10.3 | 6  | ○ |
| 6-6 | EX | 7  | 600 | 10.3 | 21 | x |
| 6-7 | EX | 7  | 300 | 10.3 | 6  | ○ |
| 6-8 | EX | 7  | 300 | 10.3 | 21 | x |

EX: extrusion-type coating apparatus
Rib evaluation:
A: superior
B: a little inferior As was apparent from Table 2, there was no rib appeared when the rod diameter of the rod portion was not larger than 20 mm.

What is claimed is:

1. A coating method comprising the steps of:
   transferring continuously, a flexible long-sized band-shaped support along a web track which is formed by a plurality of web guide rollers;
   applying a precoating layer in an excessive amount by a precoating apparatus, comprising an extrusion head portion, on one surface of said flexible long-sized band-shaped support which is supported on said plurality of web guide rollers, wherein a leading end surface of said extrusion head portion is pressed against said one surface of said flexible band-shaped support which is supported on said web guide rollers so that said precoating layer is applied thereto, further wherein a convex curved doctor edge surface disposed on a downstream side of said extrusion head portion is pressed against said one surface of said flexible band-shaped support; and
   pressing a rod portion, which is located downstream of said doctor edge surface, against said precoating layer to thereby scrape off at least a portion of said excessive amount of said precoating layer so as to lay a final coating layer measured to a desired amount,
   wherein a relation between a coating amount of said precoating layer and a coating amount of said final coating layer satisfies an expression [1]:

$$6\eta^{-0.3} \leq H/h \quad [1]$$

where H designates the coating amount of said precoating layer ($cc/m^2$); h, the coating amount and virtual coating amount of said final coating layer; and $\eta$, viscosity (cp) of said coating liquid.

2. A coating method according to claim 1, wherein a flat bar having a rod diameter not larger than 6 mm is used as said rod portion to scrape off at least a portion of said excessive amount of said precoating layer.

3. A coating method according to claim 1, wherein the coating amount of said final coating layer is made to be not larger than 15 $cc/m^2$.

4. A coating method according to claim 1, wherein said transferring continuously is performed at a speed of greater than about 160 m/mm.

5. A coating apparatus comprising:
   a plurality of web guide rollers for continuously transferring a flexible long-sized band-shaped support, said web guide rollers forming a web track;
   a precoating apparatus for applying a precoating layer in an excessive amount on one surface of a flexible long-sized band-shaped support which is supported on, and moved by, said plurality of web guide rollers, wherein said precoating apparatus comprises a convex curved doctor edge surface disposed on a downstream side of said precoating apparatus for pressing against said one surface of said flexible band-shaped support; and
   a rod portion located downstream of said doctor edge surface, and which is pressed against said precoating layer to thereby scrape off at least a portion of said excessive amount of said precoating layer so as to lay a final coating layer measured to a desired amount, wherein said rod portion has an outer-circumferential surface with Vickers hardness (Hv) of 1,000 or more;
   wherein a relation between a coating amount of said precoating layer and a coating amount of said final coating layer satisfies an expression [1]:

$$6\eta^{-0.3} \leq H/h \quad [1]$$

where H designates the coating amount of said precoating layer ($cc/m^2$); h, the coating amount and virtual coating amount of said final coating layer; and $\eta$, viscosity (cp) of said coating liquid.

6. A coating apparatus according to claim 5, wherein said rod portion is a flat rod.

7. A coating apparatus according to claim 5, wherein said rod portion comprises a super hard alloy.

8. A coating apparatus according to claim 5, wherein a rod diameter of said rod portion is not larger than 20 mm.

9. A coating apparatus according to claim 5, wherein said plurality of web guide rollers and said rod portion are arranged with respect to one another so that said rod portion lays a final coating layer measured to be not larger than 15 $cc/m^2$.

10. A coating apparatus according to claim 5, wherein said plurality of web guide rollers are configured and arranged to transfer said flexible long-sized band-shaped support at a speed of greater than about 160 m/mm.

11. A coating apparatus comprising:
    a plurality of web guide rollers for continuously transferring a flexible long-sized band-shaped support, said web guide rollers forming a web track;
    an extrusion precoating apparatus for applying a precoating layer in an excessive amount on one surface of a flexible long-sized band-shaped support, said flexible long-sized band-shaped support being supported on said plurality of web guide rollers, wherein a leading end surface of said extrusion precoating apparatus is pressed against said one surface of said flexible band-shaped support, and further wherein a convex curved doctor edge surface disposed on a downstream side of said extrusion precoating apparatus is pressed against said one surface of said flexible band-shaped support; and a rod portion, which is located downstream of said doctor edge surface, and which is pressed against said precoating layer to thereby scrape off at least a portion of said excessive amount of said precoating layer so as to lay a final coating layer measured to a desired amount, wherein said rod portion has an outer-circumferential surface with Vickers hardness (Hv) of 1,000 or more;

wherein a relation between a coating amount of said precoating layer and a coating amount of said final coating layer satisfies an expression [1]:

$$6\eta^{-0.3} \leq H/h \qquad [1]$$

where H designates the coating amount of said precoating layer (cc/m$^2$); h, the coating amount and virtual coating amount of said final coating layer; and $\eta$, viscosity (cp) of said coating liquid.

12. A coating apparatus according to claim 11 wherein said rod portion is a flat rod.

13. A coating apparatus according to claim 11, wherein said rod portion comprises a super hard alloy.

14. A coating apparatus according to claim 11, wherein a rod diameter of said rod portion is not larger than 20 mm.

15. A coating apparatus according to claim 11, wherein said plurality of web guide rollers and said rod portion are arranged with respect to one another so that said rod portion lays a final coating layer measured to be not larger than 15 cc/m$^2$.

16. A coating apparatus according to claim 11, wherein said plurality of web guide rollers are configured and arranged to transfer said flexible long-sized band-shaped support at a speed of greater than about 160 m/mm.

* * * * *